(12) United States Patent
Singh

(10) Patent No.: US 10,944,665 B1
(45) Date of Patent: Mar. 9, 2021

(54) AUTO-DISCOVERY AND PROVISIONING OF IP FABRIC UNDERLAY NETWORKS FOR DATA CENTERS

(71) Applicant: Juniper Networks, Inc., Sunnyvale, CA (US)

(72) Inventor: Nischal Singh, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/369,375

(22) Filed: Mar. 29, 2019

(51) Int. Cl.
*G06F 15/16* (2006.01)
*H04L 12/46* (2006.01)
*H04L 12/751* (2013.01)
*H04L 12/741* (2013.01)
*H04L 12/715* (2013.01)
*H04L 12/721* (2013.01)

(52) U.S. Cl.
CPC .......... *H04L 45/02* (2013.01); *H04L 12/4641* (2013.01); *H04L 45/64* (2013.01); *H04L 45/70* (2013.01); *H04L 45/74* (2013.01)

(58) Field of Classification Search
CPC ..... H04L 45/02; H04L 12/4641; H04L 45/64; H04L 45/70; H04L 45/74
USPC .................. 709/223, 238; 370/392
See application file for complete search history.

(56) References Cited

U.S. PATENT DOCUMENTS

| | | | |
|---|---|---|---|
| 10,218,604 B2 * | 2/2019 | Beeram .............. | H04L 12/18 |
| 2014/0003373 A1 * | 1/2014 | Hakola .............. | H04W 48/16 |
| | | | 370/329 |
| 2014/0328343 A1 * | 11/2014 | Kapadia .............. | H04L 45/741 |
| | | | 370/392 |
| 2017/0085629 A1 * | 3/2017 | Mahapatra .......... | H04L 67/1002 |
| 2018/0375825 A1 * | 12/2018 | Nataraja ............. | H04L 69/16 |
| 2019/0058709 A1 * | 2/2019 | Kempf ................ | G06Q 30/06 |

OTHER PUBLICATIONS

Network Virtualization in IP Fabric with BGP EVPN, Krish Padmanabhan, Extreme Network (Year: 2018).*

* cited by examiner

*Primary Examiner* — David R Lazaro
*Assistant Examiner* — Mariegeorges A Henry
(74) *Attorney, Agent, or Firm* — Shumaker & Sieffert, P.A.

(57) ABSTRACT

Techniques are described for automatic discovery and provisioning of an IP fabric underlay network for use by an overlay network of a data center. The techniques provide mechanisms for management of the IP fabric underlay network, particularly as network devices are added to the underlay network topology for use by the overlay network. The techniques enable a control plane of a network device in the IP fabric underlay network to monitor discovery of neighbor network devices and link local addresses for the neighbor network devices. The disclosed techniques further enable a control plane of the network device to configure routing sessions between the network device and each of the discovered neighbor network devices based on the link local addresses for the neighbor network devices. The configuration of the routing sessions may include an exchange of loopback addresses for the network devices used by the overlay network.

16 Claims, 4 Drawing Sheets

AUTO-DISCOVERY AND PROVISIONING OF IP FABRIC UNDERLAY NETWORKS FOR DATA CENTERS

TECHNICAL FIELD

The invention relates to computer networks and, more particularly, to data centers.

BACKGROUND

In a typical data center environment, there is a large collection of interconnected servers that provide computing (e.g., compute nodes) and/or storage capacity to run various applications. For example, a data center comprises a facility that hosts applications and services for subscribers, i.e., customers of data center. The data center for example, hosts all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

A data center switching architecture is used to provide subscribers and applications used by the subscribers with access to the data and services housed in the data center. In some examples, the data center switching architecture comprises a multi-tiered architecture in which two or more tiers of network devices are interconnected to aggregate data center traffic from servers and other devices in the data center to edge routers that communicate with other data centers or external networks. In other examples, the data center switching architecture may be flattened into a single tier of network devices directly connected to one another across a Layer 2 (L2) or Layer 3 (L3) fabric underlay network to transmit traffic directly between servers, edge routers, and other devices connected to the network devices. The underlay network may be managed with distributed data and control planes across the network devices in the data center and a centralized management and configuration system.

SUMMARY

In general, the disclosure describes techniques for automatic discovery and provisioning of an Internet Protocol (IP) fabric underlay network for use by an overlay network of a data center. The IP fabric underlay network for the data center provides IP connectivity between all network devices included in the fabric. For example, the IP fabric underlay network may comprise a spine and leaf layer topology in which network devices in a spine layer have full mesh interconnectivity with network devices in a leaf layer. The disclosed techniques provide mechanisms for management of the IP fabric underlay network, particularly as network devices, or nodes, are added to the underlay network topology for use by the overlay network.

The disclosed techniques enable a control plane of a network device in the IP fabric underlay network to monitor discovery of neighbor network devices and link local addresses for the neighbor network devices. In accordance with the disclosed techniques, IP version 6 (IPv6) may be enabled on all interfaces of the network devices included in the IP fabric underlay network, and IPv6 neighbor discovery may be enabled on all of the network devices. Unlike IPv4, IPv6 requires assignment of a link local address on every interface on which IPv6 has been enabled. In this way, the techniques enable automatic discovery of network devices included in the IP fabric underlay network using IPv6.

The disclosed techniques further enable a control plane of the network device to configure routing sessions between the network device and each of the discovered neighbor network devices based on the link local addresses for the neighbor network devices. The routing sessions may comprise external border gateway protocol (EBGP) sessions. In accordance with the disclosed techniques, the network device may configure the EBGP sessions using the link local addresses as neighbor addresses for the sessions, and without having to assign peering addresses to the neighbor network devices. In addition, the configuration of the EBGP sessions may include an exchange of loopback addresses for the network devices used by the overlay network. In this way, the techniques enable automatic provisioning of EBGP sessions in the IP fabric underlay network to support the overlay network of the data center.

In one example, this disclosure is directed to a method comprising discovering, by a network device included in an IP fabric underlay network for a data center, a link local address for each neighbor network device of a plurality of neighbor network devices included in the IP fabric underlay network. The method further comprising configuring, by the network device, a routing session between the network device and each neighbor network device based on the link local address for the respective neighbor network device, wherein routing sessions configured in the IP fabric underlay network support an overlay network.

In another example, this disclosure is directed to a network device comprising a memory, and a control unit comprising one or more processors. The processors are configured to discover a link local address for each neighbor network device of a plurality of neighbor network devices included in an IP fabric underlay network for a data center, and configure a routing session between the network device and each neighbor network device based on the link local address for the respective neighbor network device, wherein routing sessions configured in the IP fabric underlay network support an overlay network.

In a further example, this disclosure is directed to a non-transitory computer readable medium comprising instructions that, when executed, cause one or more processors of a network device to discover a link local address for each neighbor network device of a plurality of neighbor network devices included in an IP fabric underlay network for a data center. The instructions also cause the processors to configure a routing session between the network device and each neighbor network device based on the link local address for the respective neighbor network device, wherein routing sessions configured in the IP fabric underlay network support an overlay network.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
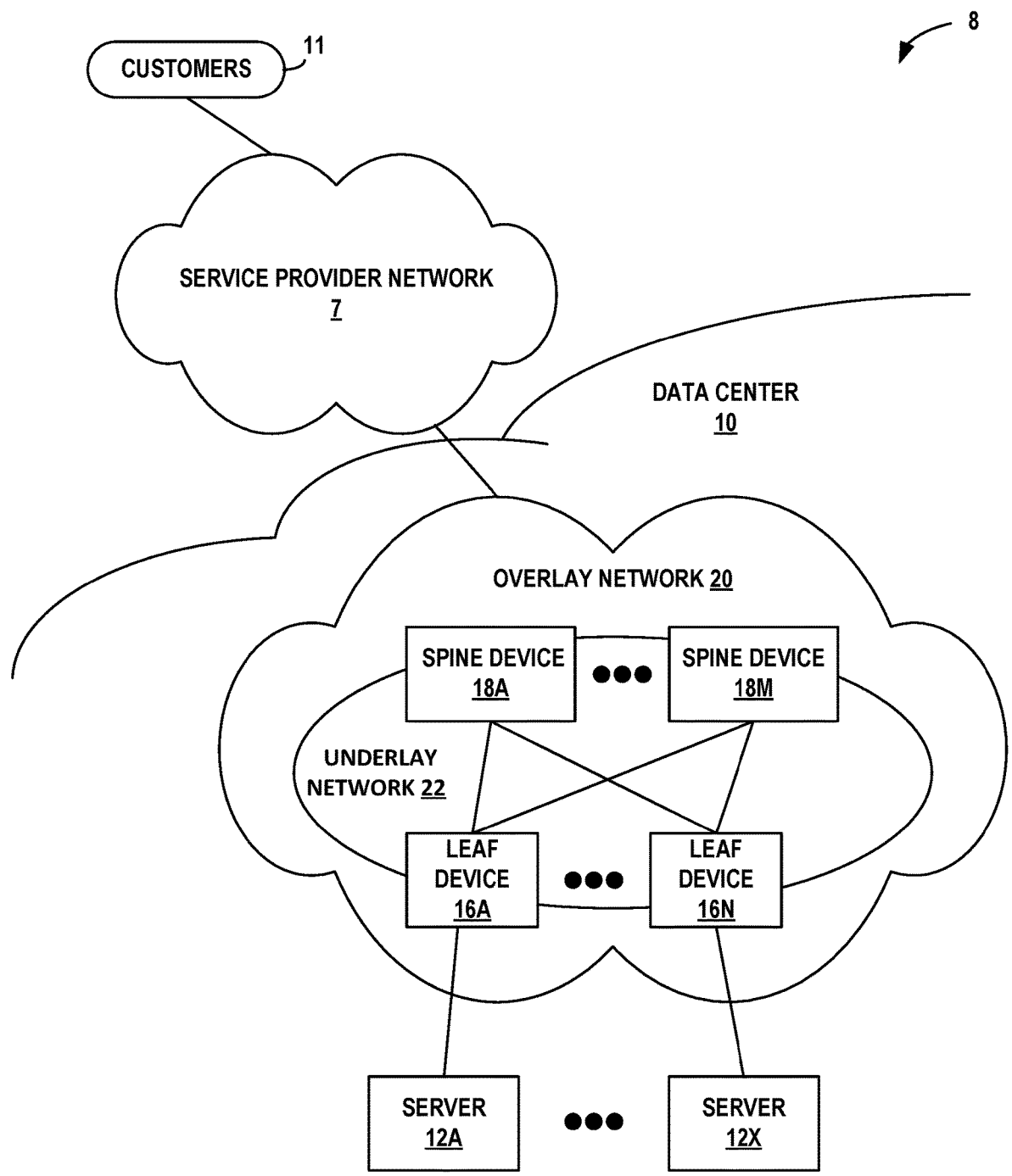
FIG. 1 is a block diagram illustrating an example network having a data center in which examples of the techniques described herein may be implemented.

FIG. 1 is a block diagram illustrating an example network system 8 having a data center 10 in which examples of the techniques described herein may be implemented. Network system 8 in the example of FIG. 1 includes data center 10 interconnected with customer networks associated with customers 11 via a service provider network 7. In general, data center 10 provides an operating environment for applications and services for customers 11 coupled to the data center by service provider network 7. Data center 10 may, for example, host infrastructure equipment, such as networking and storage systems, redundant power supplies, and environmental controls. Service provider network 7 may be coupled to one or more networks administered by other providers, and may thus form part of a large-scale public network infrastructure, e.g., the Internet.

In some examples, data center 10 may represent one of many geographically distributed network data centers. As illustrated in the example of FIG. 1, data center 10 may be a facility that provides network services for customers 11. Customers 11 may be collective categories such as enterprises and governments or individuals. For example, a network data center may host web services for several enterprises and end users. Other exemplary services may include data storage, virtual private networks, traffic engineering, file service, data mining, scientific- or super-computing, and so on. In some embodiments, data center 10 may be individual network servers, network peers, or otherwise.

In this example, data center 10 includes a set of storage systems and application servers 12A-12X (collectively, "servers 12") interconnected via an Internet Protocol (IP) fabric underlay network 22. IP fabric underlay network 22 for data center 10 provides IP connectivity between all network devices included in a fabric having a Clos-based topology. As illustrated in FIG. 1, IP fabric underlay network 22 for data center 10 comprises a spine and leaf layer topology in which spine devices 18A-18M (collectively, "spine devices 18") in a spine layer have full mesh physical interconnectivity with leaf devices 16A-16N (collectively, "leaf devices 16") in a leaf layer. Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In the example illustrated in FIG. 1, leaf devices 16 and spine devices 18 provide servers 12 with connectivity to service provider network 7. Spine devices 18 and leaf devices 16 may be network devices capable of L3 switching and routing. In some examples, leaf devices 16 may comprise top-of-rack (TOR) or access switches that enable servers 12 to access IP fabric underlay network 22 and provide uplinks to spine devices 18. In some examples, spine devices 18 may comprise chassis or aggregation switches that aggregate traffic flows and provide high-speed connectivity between leaf devices 16. In addition, spine devices 18 may perform L3 routing to route network traffic between data center 10 and customers 11 by service provider network 7. Leaf devices 16 and spine devices 18 may each include one or more processors and a memory, and that are capable of executing one or more software processes.

Leaf devices 16 and spine devices 18 may use a border gateway protocol (BGP) as a control plane or routing protocol in IP fabric underlay network 22 to advertise prefixes, perform traffic engineering, and tag traffic. More particularly, leaf devices 16 and spine devices 18 may use external BGP (EBGP) as the routing protocol in IP fabric underlay network 22. To support use of EBGP in IP fabric underlay network 22, each of spine devices 18 and each leaf devices 16 is assigned its own autonomous system (AS). In other examples, other routing protocols may be used in IP fabric underlay network 22 of data center 10.

IP fabric underlay network 22 may support an overlay network 20 in data center 10, such as a Virtual Extensible Local Area Network (VXLAN)-Ethernet Virtual Private Network (EVPN) overlay network. In this example, leaf devices 16 and spine devices 18 may support EVPN instances that function as a control plane for overlay network 22 to exchange layer 2 (L2) reachability information across data center 10 using IP fabric underlay network 22. EVPN is a media access control (MAC) address learning control plane for overlay networks. Leaf devices 16 and spine device 18 may further use VXLAN as a data plane encapsulation tool for overlay network 20 that encapsulates and tunnels traffic between the network devices in IP fabric underlay network 22. VXLAN is a tunneling protocol that encapsulates L2 frames in L3 packets enabling creation of virtualized L2 subnets or segments that span physical L3 networks, such as IP fabric underlay network 22. In other examples, IP fabric underlay network 22 may support other types of overlay networks. Moreover, although only one overlay network is illustrated in FIG. 1, IP fabric underlay network 22 may support more than one overlay network.

Overlay network protocols and tools, such as VXLAN and EVPN, define how data centers are interconnected across all business domains and verticals, including small enterprise networks, medium-sized data centers, and large content providers. Challenges remain, however, in management of the underlying IP fabric layer, especially when the fabric is growing.

This disclosure describes techniques for automatic discovery and provisioning of an IP fabric underlay network for use by an overlay network of a data center. The disclosed techniques provide mechanisms for management of the IP fabric underlay network, particularly as network devices, or nodes, are added to the underlay network topology for use by the overlay network.

With respect to FIG. 1, once the physical connectivity between leaf devices 16 and spine devices 18 has been established, the disclosed techniques may be performed by each of leaf devices 16 and spine devices 18 included in underlay network 22. In accordance with the disclosed techniques, IP version 6 (IPv6) may be enabled on all interfaces of network devices 16, 18 included in IP fabric underlay network 22, and IPv6 neighbor discovery may be enabled on all of network devices 16, 18. Unlike IPv4, IPv6 requires assignment of a link local address on every interface on which IPv6 has been enabled. A link local address is a unicast address that is valid for communications between two nodes on a same link when no other IP address has been assigned.

The disclosed techniques enable a control plane of a network device, e.g., leaf device 16A, within IP fabric underlay network 22 to monitor discovery of its physically connected neighbor network devices, e.g., spine devices 18, within IP fabric underlay network 22. More specifically, the control plane of the network device discovers the link local addresses for each of the neighbor network devices on which IPv6 has been enabled. In this way, the techniques enable automatic discovery of network devices included in IP fabric underlay network 22 using IPv6 instead of a proprietary protocol. As such, the techniques enable network administrators to use network devices made by different vendors over different layers of the IP fabric.

The disclosed techniques further enable a control plane of the network device, e.g., leaf device 16A, to configure routing sessions between the network device and each of the discovered neighbor network devices, e.g., spine devices 18, based on the link local addresses for the neighbor network devices. The routing sessions may comprise EBGP sessions. In accordance with the disclosed techniques, the network device may configure the EBGP sessions using the link local addresses as neighbor addresses for the sessions, and without having to assign peering addresses to the neighbor network devices. In addition, the configuration of the EBGP sessions may include an exchange of loopback addresses for the network devices. A loopback address is a special IP address designated for a software loopback interface of a network device. In some examples, the loopback addresses of the network devices may be used as VXLAN tunnel addresses for overlay network 20. In this way, the techniques enable automatic provisioning of EBGP sessions in IP fabric underlay network 22 to support overlay network 20 of data center 10.

In addition, the control plane of the network device within IP fabric underlay network 22 continuously monitors the discovery of its physically connected neighbor network devices included in IP fabric underlay network 22. The network device then performs automatic discovery and provisioning for each newly discovered neighbor network device added to IP fabric underlay network 22 for the data center 10. In this way, the techniques provide a scalable and future protective solution as data center sites grow without having to plan for additional IP addresses or BGP sessions to accommodate growth of the data center sites.

Figure 2:
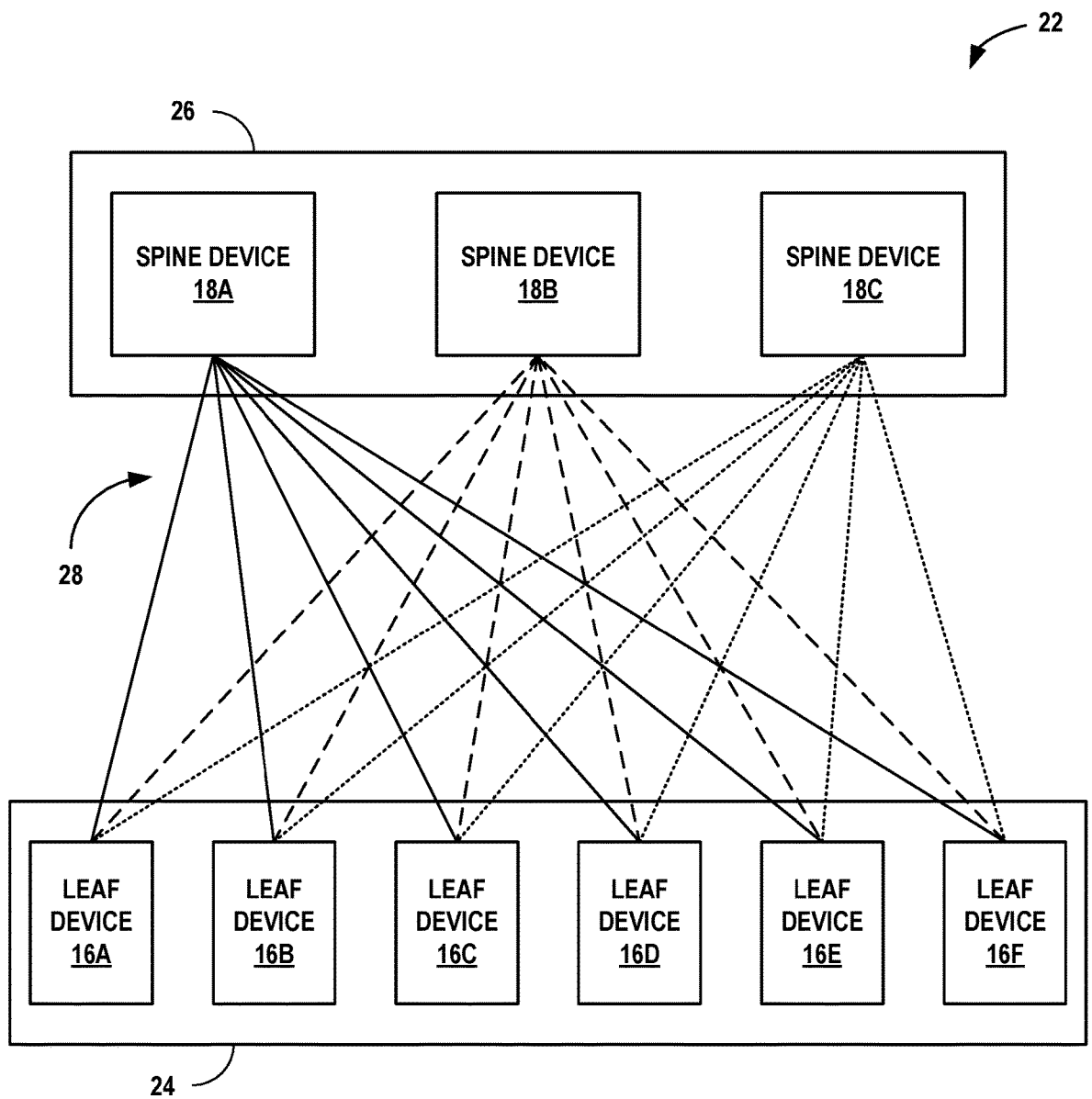
FIG. 2 is a block diagram illustrating an example IP fabric underlay network for a data center including network devices arranged in a spine and leaf layer topology.

FIG. 2 is a block diagram illustrating an example of IP fabric underlay network 22 for data center 10 including network devices 16, 18 arranged in a spine and leaf layer topology. The architecture illustrated in FIG. 2 is merely exemplary and, in other examples, IP fabric underlay network 22 may conform to a different architecture.

In the example of FIG. 2, IP fabric underlay network 22 comprises a spine and leaf layer topology in which leaf devices 16 are arranged in a leaf layer 24 and spine devices 18 are arranged in a spine layer 26. As illustrated in FIG. 2, each of spine devices 18 is physically connected to all of leaf devices 16 in a full mesh of links 28 such that any of leaf devices 16 may communicate a packet flow to any other of leaf devices 16 via any of spine devices 18. In this topology, there are no direct physical connections between leaf devices 16 within leaf layer 24 and no direct physical connections between spine devices 18 within spine layer 26.

As discussed with respect to FIG. 1, spine devices 18 and leaf devices 16 may be network devices capable of L3 switching and routing. In some examples, leaf devices 16 may comprise specialized TOR or access switches that provide access to IP fabric underlay network 22, and spine devices 18 may comprise specialized chassis or aggregation switches that aggregate traffic flows and provide connectivity between leaf devices 16. In other examples, leaf devices 16 and spine devices 18 may comprise the same type of network device capable of providing both access and aggregation functionality.

IP fabric underlay network 22 may include distributed data and control planes across leaf devices 16 and spine devices 18 with centralized management through which an administrator (not shown) can interact with any of the leaf devices 16 and spine devices 18. For example, the administrator may be connected to each of leaf devices 16 and spine devices 18 to monitor, configure, or otherwise manage the network devices. For example, the administrator may access each of the network devices via a command line interface (CLI).

In accordance with the disclosed techniques, IPv6 may be enabled on all interfaces of leaf devices 16 and spine devices 18, and IPv6 neighbor discovery may be enabled on all of leaf devices 16 and spine devices 18. In some examples, one or more of leaf devices 16 and spine devices 18 may be preprogrammed with IPv6 enabled interfaces and IPv6 neighbor discovery. In other examples, one or more of leaf devices 16 and spine devices 18 may be configured by the administrator via CLI commands, for example, to enable IPv6 on the interfaces and enable IPv6 neighbor discovery. With IPv6 enabled, an IPv6 link local address is assigned on every interface of each of leaf devices 16 and spine devices 18.

When physical connections are setup between leaf devices 16 and spine devices 18, the techniques of this disclosure enable automatic discovery of the link local addresses on the interfaces of the connected network devices. For example, when leaf device 16A is physically connected to spine device 18A, leaf device 16A discovers the link local address assigned to the connected interface of spine device 18A and spine device 18A likewise discovers the link local address assigned to the connected interface of leaf device 16A. According to the disclosed techniques, the discovered link local addresses may then be used to automatically provision routing sessions between each pair of leaf devices 16 and spine devices 18, e.g., between leaf device 16A and spine device 18A. In the case where the routing sessions comprise EBGP sessions, the disclosed techniques avoid having to assign peering addresses to the neighbor network devices to support EBGP. In addition, when the routing sessions are provisioned, loopback addresses of leaf devices 16 and spine devices 18 may be exchanged. In some examples, the loopback addresses may be used to support an overlay network, e.g., overlay network 20 from FIG. 1, built over IP fabric underlay network 22.

Figure 3:
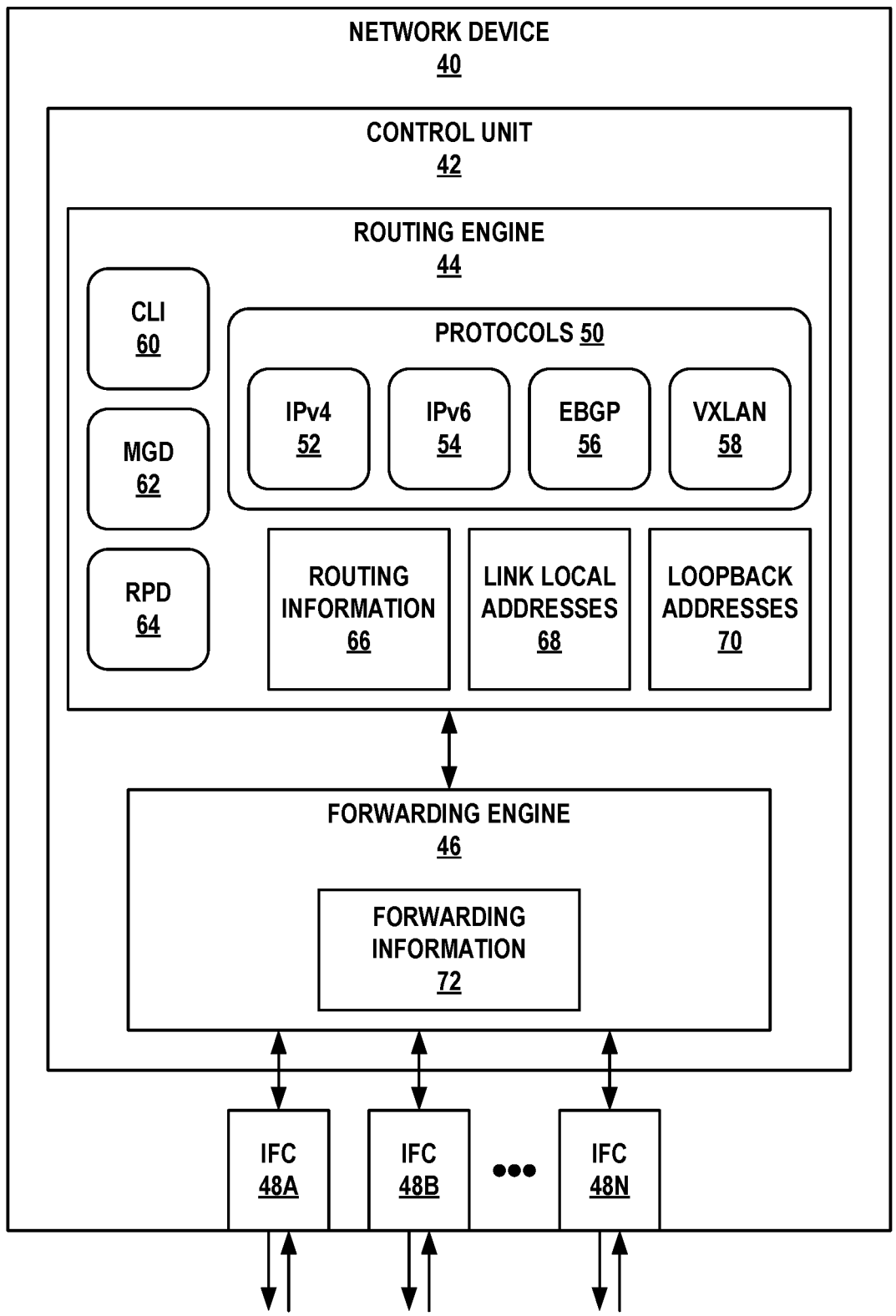
FIG. 3 is a block diagram illustrating an example network device configured to perform auto-discovery and provisioning of an IP fabric underlay network for use by an overlay network of a data center, in accordance with the techniques of this disclosure.

FIG. 3 is a block diagram illustrating an example network device 40 configured to perform auto-discovery and provisioning of an IP fabric underlay network for use by an overlay network of a data center, in accordance with the techniques of this disclosure. Network device 40 may operate as any network device of IP fabric underlay network 22 of FIGS. 1 and 2, such as one of leaf devices 16 or spine devices 18.

In the illustrated example of FIG. 3, network device 40 includes a control unit 42 with a routing engine 44 that provides control plane functionality for the network device and a forwarding engine 46 that provides forwarding or data plane functionality for the network device to send and receive traffic by a set of interface cards 48A-48N (collectively, "IFCs 48") that typically have one or more physical network interface ports. Forwarding engine 46 performs packet switching and forwarding of incoming data packets for transmission over a network.

As shown in FIG. 3, forwarding engine 46 includes forwarding information 72 that stores forwarding data structures associating network destinations with next hops and outgoing interfaces. Although not shown in FIG. 3, forwarding engine 46 may comprise a central processing unit (CPU), memory and one or more programmable packet-forwarding application-specific integrated circuits (ASICs).

Routing engine 44 includes various protocols 50 that perform routing functions for network device 40. In the illustrated example of FIG. 3, protocols 50 include IPv4 52, IPv6 54, and EBGP 56 as routing protocols used to exchange routing information with other network devices in a network, e.g., an IP fabric underlay network, in order to discover the network topology and update routing information 66. In this example, EBGP 56 is the routing protocol used to configure routing sessions between network device 40 and the other network devices in the network. In other examples, protocols 50 may include other routing protocols, such as BGP or internal BGP (IBGP).

Protocols 50 also include VXLAN 58 as a tunneling protocol used to create an overlay network on top of the IP fabric underlay network. More specifically, network device 40 may use VXLAN 58 may create the overlay network by encapsulating traffic and tunneling the traffic over the IP fabric underlay network. In accordance with the disclosed techniques, network device 40 may use loopback addresses 70 of the other network devices in the network as VXLAN tunnel addresses to encapsulate and tunnel traffic for the overlay network between the network devices.

Routing information 66 may describe the topology of the network in which network device 40 resides, and may also describe various routes within the network and the appropriate next hops for each route, i.e., the neighboring routing devices along each of the routes. Routing engine 44 analyzes the information stored in routing information 66 to generate forwarding information 72. Routing engine 44 installs forwarding data structures into forwarding information 72 within forwarding engine 46. Forwarding information 72 associates network destinations with specific next hops and corresponding interface ports within the data plane.

In the example of FIG. 3, routing engine 44 includes a command line interface (CLI) 60 that provides access for an administrator (not shown) to monitor, configure, or otherwise manage network device 40. Routing engine 44 also includes a management daemon (MGD) 62 as a user-level process that runs network management software. In addition, routing engine 44 includes a routing protocol daemon (RPD) 64 as a user-level process that executes the routing protocols to communicate with peer routers or switches, maintain and update one or more routing tables in routing engine 44, and create one or more forwarding tables for installation in forwarding engine 46, among other functions.

According to the disclosed techniques, IPv4 52 and IPv6 54 are enabled on all the physical network interface ports of IFCs 48 of network device 40, and IPv6 neighbor discovery is enabled on network device 40. In some examples, network device 40 may be preprogrammed with IPv6 enabled interfaces and IPv6 neighbor discovery. In other examples, network device 40 may be configured by the administrator via CLI 60 to enable IPv6 54 on the physical interface ports of IFCs 48 and enable IPv6 neighbor discovery. When IPv6 is enabled, an IPv6 link local address is assigned on each of the physical interface ports of IFCs 48. In one example, the following CLI commands may be used to configure IPv6 addressing and IPv6 neighbor discovery on network device 40 using "inet6" as the protocol family name for IPv6.

set protocols router-advertisement interface all
    set groups FAMILY-INET6 interfaces family inet6
    set interfaces apply-groups FAMILY-INET6

As network device 40 is physically connected to other network devices in the IP fabric underlay network, routing engine 44 discovers the neighbor network devices and neighbor link local addresses. According to the techniques of the disclosure, MGD 62 is configured to execute a first script, e.g., an operation script or an event script, to monitor discovery of neighbor network devices included in the IP fabric underlay network and, thus, discover a link local address for each of the discovered neighbor network devices. Control unit 42 then propagates the link local addresses for the discovered neighbor network devices from forwarding engine 46 up to routing engine 44, and stores the link local addresses in routing engine 44 as link local addresses 68. In one example, the first script may be "run show ipv6 neighbors" executed by MGD 62 to discover the link local addresses for the neighbor network devices. An example output of the "run show ipv6 neighbors" may include the following.

| | |
|---|---|
| IPv6 Address: | fe80::21d:b5ff:fe42:3fc3 |
| Linklayer Address: | 00:1d:b5:42:3f:c3 |
| State: | reachable |
| Exp: | 17 |
| Rtr: | yes |
| Secure: | no |
| Interface: | ae70.0 |

MGD 62 is further configured to execute the first script to continuously monitor discovery of the neighbor network devices included in the IP fabric underlay network, and perform automatic discovery and provisioning for each newly discovered neighbor network device. In this way, MGD 62 may monitor any new discovery of neighbor network devices added to the IP favorable underlay network and physically connected to network device 40. Once a new neighbor network device is discovered, MGD 62 discovers the link local address for the new neighbor network device and configures a routing session with the new network device, as described in more detail below.

Routing engine 44 may also configure a loopback address for network device 40 for each of the enabled IPv4 and IPV6 addresses families. The loopback addresses for network device 40 may be chosen from an IP address range that is allocated to the data center in which network device 40 resides and reserved for use as unique IP addresses for individual network devices as the data center grows. Similarly, routing engine 44 may configure a private autonomous system number (ASN) pair for network device 40 and each of its physically connected neighbor network devices, e.g., each spine-leaf pair. The ASNs of the ASN pair may be chosen from a private ASN range allocated to the data center. In some examples, unique ASNs from the private ASN range (e.g., 65000.1 to 65000.65500) may be used for network device 40 and the neighbor network devices to create unique ASN pairs for each spine-leaf pair in the data center. In scenarios where managing a unique ASN pair for each spine-leaf pair in the data center is not possible, then the same ASNs may be used local and peer ASNs for each spine-leaf pair with the addition of commands to enable AS override and AS loops.

As one example, where network device 40 comprises a spine device, the following CLI commands may be used to configure the ASN pair for a spine-leaf pair that always uses a local ASN of 65000.1 and a Peer ASN of 65000.2. In the following example, "test_link-local" is the name of the BGP group and the neighbor address is the link local address discovered for the neighbor network device.

set protocols bgp group test_link-local peer-as 65000.2
    set protocols bgp group test_link-local local-as 65000.1
    set protocols bgp group test_link-local neighbor fe80:: 21d:b5ff:fe42:3fc3 as-override
    set routing-options autonomous-system loops As another example, where network device 40 comprises a leaf device, the following CLI commands may be used to configure the ASN pair for a spine-leaf pair that always uses a local ASN of 65000.2 and a Peer ASN of 65000.1. In the following example, "test_link-local" is again the name of the BGP group.

set protocols bgp group test_link-local peer-as 65000.1
    set protocols bgp group test_link-local local-as 65000.2
    set protocols bgp group test_link-local neighbor fe80:: 21d:b5ff:fe42:3fc3 as-override
    set routing-options autonomous-system loops According to the disclosed techniques, MGD 62 is further configured to execute a second script e.g., an operation script or an event script, to configure a routing session between network device 40 and a respective one of the discovered neighbor network devices using the link local address for the respective one of the discovered neighbor network devices as a neighbor address for the routing session. The second script executed by MGD 62 may further cause routing engine 44 to assign an outgoing interface of network device 40 for the routing session, enable IPv4 and IPv6 address families for the routing session, exchange a lookback address for network device 40 with the respective one of the neighbor network devices, and assign ASNs for network device 40 and the respective one of the neighbor network devices as an ASN pair for the routing session. Routing engine 44 may store the loopback addresses of the neighbor network devices that are exchanged during configuration of the routing session as loopback addresses 70. As described above, routing engine 44 may use loopback addresses 70 to support an overlay network built on top of the IP fabric underlay network.

In one example, the following commands may comprise the second script executed by MGD 62 to configure an EBGP session between network device 40 and the neighbor network device using the link local address discovered for the neighbor network device. In the following example, "test_link-local" is the name of a BGP group, the local-interface is the interface of network device 40 on which the link local address of the neighbor network device was received, "inet6" is the protocol family name for IPv6, "inet" is the protocol family name for IPv4, LOOPBACK_ADDRESS includes both IPv4 and IPv6 loopback addresses configured from network device 40, and the neighbor address is the link local address discovered for the neighbor network device.

set protocols bgp group test_link-local type external
    set protocols bgp group test_link-local local-interface ae70.0
    set protocols bgp group test_link-local family inet6 unicast
    set protocols bgp group test_link-local family inet unicast
    set protocols bgp group test_link-local export LOOPBACK_ADDRESS
    set protocols bgp group test_link-local peer-as 65000.2
    set protocols bgp group test_link-local local-as 65000.1
    set protocols bgp group test_link-local neighbor fe80::2d: b5ff:fe42:3fc3

Once the above steps of automatic discovery and provisioning are completed, the IP fabric underlay network may be ready to support various overlay network options, including VXLAN and EVPN. As the data center increases in size and new network devices are added to the spine and leaf layers, MGD 62 continues to monitor the new connections and perform the automatic discovery and provisioning to accommodate the growth of the IP fabric underlay network for the data center. In some examples, the above steps for the automatic discovery and provisioning may be combined to a single configuration knob, e.g., "set protocols evpn ip-fabric-discovery," that is executable by MGD 62.

Figure 4:
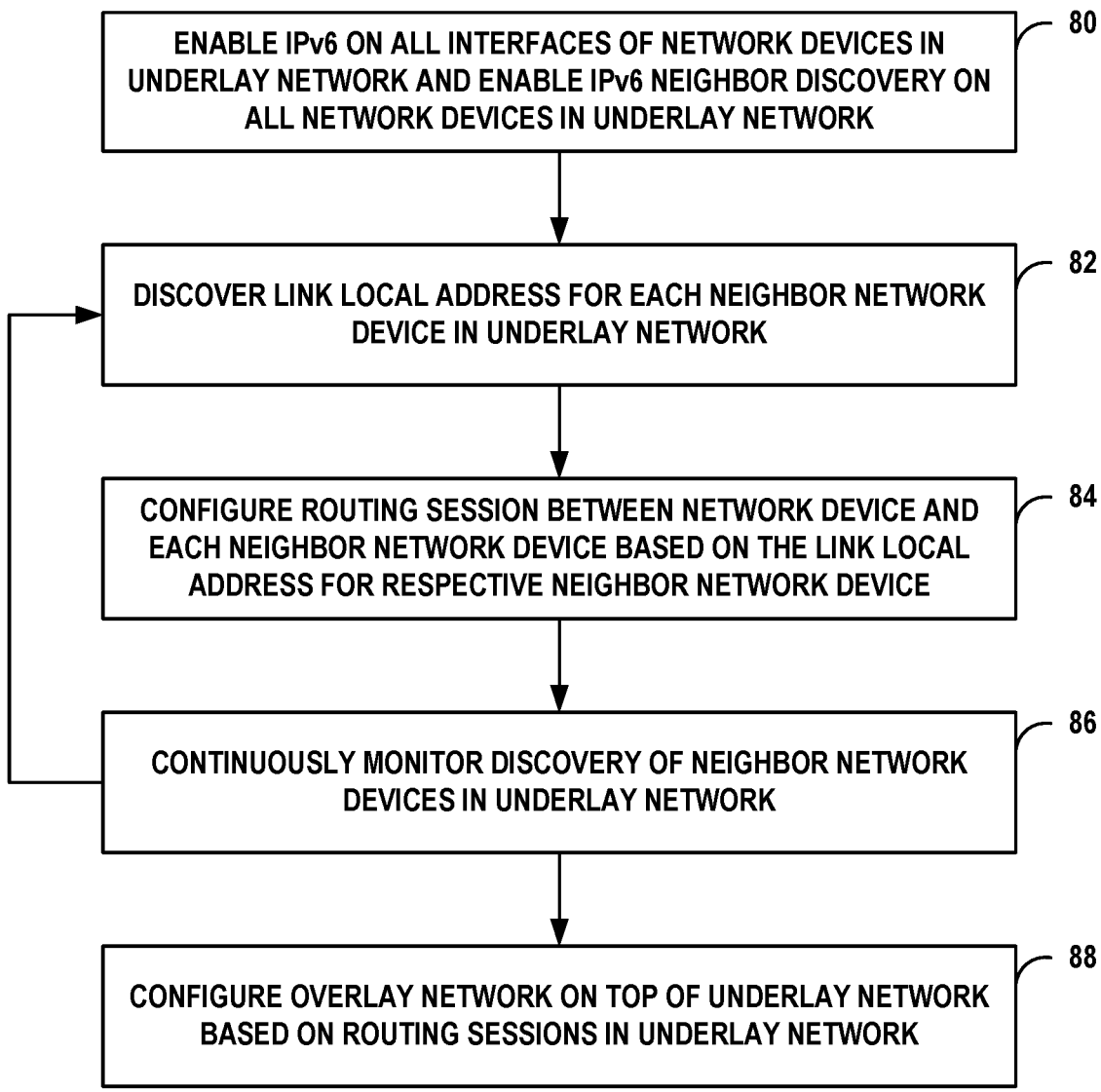
FIG. 4 is a flowchart illustrating an example operation of a network device in an IP fabric underlay network for a data center, in accordance with the techniques of the disclosure.

FIG. 4 is a flowchart illustrating an example operation of a network device in an IP fabric underlay network for a data center, in accordance with the techniques of the disclosure. The operation of FIG. 4 is described with respect to network device 40 from FIG. 3. In other examples, the operation of FIG. 4 may be performed by any of leaf devices 16 or spine devices 18 from FIGS. 1 and 2.

As described above with respect to FIG. 2, the IP fabric underlay network may comprise a spine and leaf layer topology having a plurality of spine devices arranged in a spine layer and a plurality of leaf devices arranged in a leaf layer, where the spine devices and the leaf devices are physically connected in a full mesh. Network device 40 may comprise either one of the spine devices or one of the leaf devices.

In accordance with the techniques of this disclosure, IPv6 is enabled on all the interfaces of the network devices in the IP fabric underlay network, and IPv6 neighbor discovery is enabled on all of the network devices (80). In some examples, one or more of the network devices may be preprogrammed with IPv6 enabled interfaces and IPv6 neighbor discovery. In other examples, one or more of the network devices may be configured in the field to enable IPv6 on the interfaces and enable IPv6 neighbor discovery.

Once network device 40 is physically connected to a plurality of neighbor network devices, routing engine 44 discovers a link local address for each neighbor network device of the plurality of neighbor network devices included in the IP fabric underlay network (82). The discovered link local address comprises an IPv6 link local address for an interface of each neighbor network device on which IPv6 has been enabled. To discover the link local address for each neighbor network device, control unit 42 of network device 40 executes a first script in MGD 62 to monitor discovery of the plurality of neighbor network devices, and propagates the link local addresses for the discovered neighbor network devices from forwarding engine 46 (i.e., the forwarding plane) up to routing engine 44 (i.e., the control plane).

Routing engine 44 configures a routing session between network device 40 and each neighbor network device based on the link local address for the respective neighbor network device (86). The configured routing session comprises an EBGP session between network device 40 and each neighbor network device based on the link local address for the respective neighbor network device. To configure the routing session between network device 40 and the respective neighbor network device, control unit 42 of network device 40 executes a second script in MGD 62 to assign the link local address for the respective neighbor network device as a neighbor address for the routing session. In addition, control unit 42 executes the script in MGD 62 to assign an outgoing interface 48 of network device 40 for the routing session, enable IP address families (e.g., inet4 and inet6) for the routing session, exchange a lookback address for network device 40 with the respective neighbor network device, and assign ASNs for network device 40 and the respective neighbor network device as an ASN pair for the routing session.

Routing engine 44 continuously monitors discovery of the plurality of neighbor network devices included in the IP fabric underlay network (86). Routing engine 44 then performs automatic discovery and provisioning (82, 84) for each newly discovered neighbor network device added to the IP fabric underlay network and physically connected to network device 40.

An overlay network configured on top of the IP fabric underlay network may be supported by the routing sessions configured in the IP fabric underlay network. As part of configuring the routing sessions, routing engine 44 exchanges the loopback address for network device 40 with each neighbor network device. In this way, each network device included in the IP fabric underlay network learns the loopback addresses of all the network devices in the leaf and spine layers in order to support the overlay network. For example, the overlay network may comprise a VXLAN-EVPN overlay network in which VXLAN uses the loopback addresses to encapsulate and tunnel traffic for the overlay network between the network devices in the IP fabric underlay network.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A method comprising:
discovering, by a network device included in an Internet Protocol (IP) fabric underlay network for a data center, a link local address for each neighbor network device of a plurality of neighbor network devices included in the IP fabric underlay network, wherein discovering the link local address for each neighbor network device comprises:
monitoring, by a control plane of the network device, discovery in a forwarding plane of the network device of each neighbor network device of the plurality of neighbor network devices, and
propagating the link local address for each neighbor network device discovered in the forwarding plane of the network device to the control plane of the network device; and
configuring, by the network device, a routing session between the network device and each neighbor network device based on the link local address discovered for the respective neighbor network device, wherein configuring the routing session between the network device and the respective neighbor network device comprises assigning, by the control plane of the network device, the link local address discovered for the respective neighbor network device as a neighbor address used in the configuration of the routing session, wherein routing sessions configured in the IP fabric underlay network support an overlay network.

2. The method of claim 1, wherein IP version 6 (IPv6) is enabled on all interfaces of the network device and IPv6 neighbor discovery is enabled on the forwarding plane of the network device, and wherein discovering the link local address comprises monitoring discovery in the forwarding plane of an IPv6 link local address for an interface of each neighbor network device on which IPv6 has been enabled.

3. The method of claim 1, wherein configuring the routing session comprises configuring an external border gateway protocol (EBGP) session between the network device and each neighbor network device based on the link local address for the respective neighbor network device.

4. The method of claim 1, wherein monitoring discovery in the forwarding plane comprises continuously monitoring discovery in the forwarding plane of the plurality of neighbor network devices included in the IP fabric underlay network.

5. The method of claim 1, further comprising configuring a loopback address for the network device, wherein configuring the routing session between the network device and each neighbor network device includes exchanging the loopback address for the network device with each neighbor network device, wherein the loopback address is used to support the overlay network.

6. The method of claim 1, wherein configuring the routing session between the network device and the respective neighbor network device further comprises, by the control plane of the network device:
assigning an outgoing interface of the network device for the routing session;
enabling IP address families for the routing session;

configuring a lookback address for the network device for each of the enabled IP address families for use by the respective neighbor network device; and assigning autonomous system numbers (ASNs) for the network device and the respective neighbor network device as an ASN pair for the routing session.

7. The method of claim 1, wherein the IP fabric underlay network comprises a spine and leaf layer topology, and wherein the network device is included in a first layer of the topology and physically connected to each neighbor network device in a second layer of the topology.

8. The method of claim 1, wherein the overlay network comprises a Virtual Extensible Local Area Network (VXLAN)-Ethernet Virtual Private Network (EVPN) overlay network.

9. A network device comprising:
a memory; and
a control unit comprising one or more processors configured to:
discover a link local address for each neighbor network device of a plurality of neighbor network devices included in an Internet Protocol (IP) fabric underlay network for a data center, wherein the one or more processors are further configured to:
execute a control plane of the network device to monitor discovery in a forwarding plane of the network device of each neighbor network device of the plurality of neighbor network devices, and propagate the link local address for each neighbor network device discovered in the forwarding plane of the network device to the control plane of the network device, and
configure a routing session between the network device and each neighbor network device based on the link local address discovered for the respective neighbor network device, wherein the one or more processors are further configured to execute the control plane of the network device to assign the link local address discovered for the respective neighbor network device as a neighbor address used in the configuration of the routing session, wherein routing sessions configured in the IP fabric underlay network support an overlay network.

10. The network device of claim 9, wherein the IP fabric underlay network comprises a spine and leaf layer topology, and wherein the network device is included in a first layer of the topology and physically connected to each neighbor network device in a second layer of the topology.

11. The network device of claim 10, wherein IP version 6 (IPv6) is enabled on all interfaces of the network device and IPv6 neighbor discovery is enabled on the forwarding plane of the network device, and wherein the one or more processors are configured to execute the control plane to monitor discovery in the forwarding plane of an IPv6 link local address for an interface of each neighbor network device on which IPv6 has been enabled.

12. The network device of claim 10, wherein the one or more processors are configured to configure an external border gateway protocol (EBGP) session between the network device and each neighbor network device based on the link local address for the respective neighbor network device.

13. The network device of claim 10, wherein the one or more processors are further configured to execute the control plane to continuously monitor discovery of the plurality of neighbor network devices included in the underlay network.

14. The network device of claim 10, wherein the one or more processors are configured to configure a loopback address for the network device, wherein, to configure the routing session between the network device and each neighbor network device, the one or more processors are configured to exchange the loopback address for the network device with each neighbor network device, wherein the loopback address is used to support the overlay network.

15. The network device of claim 10, wherein the one or more processors are further configured to execute the control plane of the network device to:
assign an outgoing interface of the network device for the routing session;
enable IP address families for the routing session;
configure a lookback address for the network device for each of the enabled IP address families for use by the respective neighbor network device; and
assign autonomous system numbers (ASNs) for the network device and the respective neighbor network device as an ASN pair for the routing session.

16. A non-transitory computer readable medium comprising instructions that, when executed, cause one or more processors of a network device to:
discover a link local address for each neighbor network device of a plurality of neighbor network devices included in an Internet Protocol (IP) fabric underlay network for a data center, wherein the instructions further cause the one or more processors to:
execute a control plane of the network device to monitor discovery in a forwarding plane of the network device of each neighbor network device of the plurality of neighbor network devices, and
propagate the link local address for each neighbor network device discovered in the forwarding plane of the network device to the control plane of the network device; and
configure a routing session between the network device and each neighbor network device based on the link local address discovered for the respective neighbor network device, wherein the instructions further cause the one or more processors to execute the control plane of the network device to assign the link local address discovered for the respective neighbor network device as a neighbor address used in the configuration of the routing session, wherein routing sessions configured in the IP fabric underlay network support an overlay network.

* * * * *

UNITED STATES PATENT AND TRADEMARK OFFICE
CERTIFICATE OF CORRECTION

PATENT NO. : 10,944,665 B1
APPLICATION NO. : 16/369375
DATED : March 9, 2021
INVENTOR(S) : Nischal Singh It is certified that error appears in the above-identified patent and that said Letters Patent is hereby corrected as shown below:

In the Claims

Column 13, Line 49 (Claim 11): Replace "device of claim 10" with --device of claim 9--

Column 13, Line 57 (Claim 12): Replace "device of claim 10" with --device of claim 9--

Column 14, Line 5 (Claim 13): Replace "device of claim 10" with --device of claim 9--

Column 14, Line 9 (Claim 14): Replace "device of claim 10" with --device of claim 9--

Column 14, Line 18 (Claim 15): Replace "device of claim 10" with --device of claim 9--

Signed and Sealed this
Tenth Day of January, 2023

Katherine Kelly Vidal
*Director of the United States Patent and Trademark Office*